United States Patent
Lin et al.

(10) Patent No.: US 11,490,084 B2
(45) Date of Patent: Nov. 1, 2022

(54) METHOD AND APPARATUS FOR ADJUSTING QUANTIZATION PARAMETER FOR ADAPTIVE QUANTIZATION

(71) Applicant: Beijing Baidu Netcom Science and Technology Co., Ltd., Beijing (CN)

(72) Inventors: Ke Lin, Beijing (CN); Wenpeng Ding, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/353,415

(22) Filed: Jun. 21, 2021

(65) Prior Publication Data

US 2021/0337205 A1    Oct. 28, 2021

(30) Foreign Application Priority Data

Dec. 28, 2020 (CN) .......................... 202011595161.1

(51) Int. Cl.
*H04N 19/124* (2014.01)
*H04N 19/13* (2014.01)
(Continued)

(52) U.S. Cl.
CPC .......... *H04N 19/124* (2014.11); *H04N 19/13* (2014.11); *H04N 19/132* (2014.11); *H04N 19/176* (2014.11)

(58) Field of Classification Search
CPC .. H04N 19/124; H04N 19/154; H04N 19/176; H04N 19/14; H04N 19/147
See application file for complete search history.

(56) References Cited

U.S. PATENT DOCUMENTS 6,023,296 A * 2/2000 Lee .................. H04N 19/17
                                              375/E7.218
6,208,745 B1 * 3/2001 Florencio .......... H04N 19/00
                                              382/250
(Continued)

FOREIGN PATENT DOCUMENTS

CN         102970536 A        3/2013
CN         104469386 A *      3/2015
(Continued)

OTHER PUBLICATIONS

Combined Search and Examination Search Report dated Oct. 28, 2021 of corresponding Great Britain Patent Application No. 2108388.6 (twelve pages).

*Primary Examiner* — Daniel Chang
(74) *Attorney, Agent, or Firm* — Kilpatrick Townsend & Stockton LLP (57) ABSTRACT

An implementation of a method for adjusting a quantization parameter for adaptive quantization may include: acquiring at least one pixel block corresponding to a to-be-compressed image and an initial quantization parameter adjustment value corresponding to the pixel block, the initial quantization parameter adjustment value being generated based on an image objective quality evaluation index; determining a just noticeable difference, JND, threshold corresponding to each pixel point in the at least one pixel block; determining a block JND threshold corresponding to each pixel block, based on the JND threshold corresponding to each pixel point in the at least one pixel block; and adjusting the corresponding initial quantization parameter adjustment value based on the block JND threshold to generate an adjusted quantization parameter adjustment value corresponding to the at least one pixel block.

18 Claims, 5 Drawing Sheets

(51) Int. Cl.
*H04N 19/132* (2014.01)
*H04N 19/176* (2014.01)

(56) References Cited

U.S. PATENT DOCUMENTS

| | | | | |
|---|---|---|---|---|
| 6,366,705 B1* | 4/2002 | Chiu | ............ | H04N 19/176 |
| | | | | 375/E7.176 |
| 6,535,555 B1* | 3/2003 | Bordes | ............ | H04N 19/154 |
| | | | | 348/420.1 |
| 6,690,833 B1* | 2/2004 | Chiang | ............ | H04N 19/115 |
| | | | | 375/E7.181 |
| 7,006,568 B1* | 2/2006 | Gu | ............ | H04N 19/13 |
| | | | | 375/240.03 |
| 7,936,818 B2* | 5/2011 | Jayant | ............ | H04N 19/103 |
| | | | | 382/235 |
| 9,245,310 B2* | 1/2016 | Zhao | ............ | G06T 1/005 |
| 9,838,713 B1* | 12/2017 | Sim | ............ | H04N 19/147 |
| 10,356,404 B1 | 7/2019 | Khsib | | |
| 2005/0094845 A1* | 5/2005 | Lee | ............ | G06T 1/0028 |
| | | | | 382/240 |
| 2007/0002946 A1* | 1/2007 | Bouton | ............ | H04N 19/162 |
| | | | | 375/E7.13 |
| 2010/0027898 A1* | 2/2010 | Lee | ............ | G06T 7/254 |
| | | | | 382/236 |
| 2010/0086063 A1* | 4/2010 | Haskell | ............ | H04N 19/156 |
| | | | | 348/E17.001 |
| 2011/0090951 A1* | 4/2011 | Ryu | ............ | H04N 19/63 |
| | | | | 375/E7.126 |
| 2011/0243228 A1* | 10/2011 | Ngan | ............ | H04N 19/61 |
| | | | | 375/E7.076 |
| 2012/0207212 A1 | 8/2012 | Lin et al. | | |
| 2013/0266237 A1* | 10/2013 | Li | ............ | H04N 19/154 |
| | | | | 382/251 |
| 2014/0169451 A1* | 6/2014 | Cohen | ............ | H04N 19/154 |
| | | | | 375/240.03 |
| 2016/0353131 A1* | 12/2016 | Kim | ............ | H04N 19/154 |
| 2017/0155903 A1* | 6/2017 | Rosewarne | ............ | H04N 19/13 |
| 2018/0255302 A1* | 9/2018 | Galpin | ............ | H04N 19/463 |
| 2019/0116361 A1* | 4/2019 | Rusanovskyy | ............ | H04N 19/197 |
| 2019/0238890 A1* | 8/2019 | Tsai | ............ | H04N 19/132 |

FOREIGN PATENT DOCUMENTS

| | | | |
|---|---|---|---|
| CN | 108521572 A | | 9/2018 |
| CN | 110062234 A | | 7/2019 |
| CN | 111988611 A | * | 11/2020 |
| CN | 111988611 A | | 11/2020 |
| WO | WO-2011050978 A1 | * | 5/2011 ............ H04N 19/124 |

* cited by examiner

METHOD AND APPARATUS FOR ADJUSTING QUANTIZATION PARAMETER FOR ADAPTIVE QUANTIZATION

CROSS-REFERENCE TO RELATED APPLICATIONS

This application claims priority to Chinese Patent Application No. 202011595161.1, filed with the China National Intellectual Property Administration (CNIPA) on Dec. 28, 2020, the content of which is incorporated herein by reference in its entirety.

TECHNICAL FIELD

The present disclosure relates to the field of image processing technology, in particular to image compression coding and video compression coding technologies.

BACKGROUND

With the rapid development of computer technology, the scale of image data is getting larger and larger, and demands for image compression and video compression are also increasing day by day.

In the prior art, commonly used image compression methods may include a transform coding method, that is, quantizing an image transformed by means of Fourier transform or the like, and then performing image coding (e.g., entropy coding). Commonly used video compression methods may include advanced video coding (AVC), high efficiency video coding (H.265/HEVC), etc.

SUMMARY

Embodiments of the present disclosure provides a method and apparatus for adjusting a quantization parameter for adaptive quantization, a device, a storage medium and a computer program product.

According to a first aspect, some embodiments of the present disclosure provide a method for adjusting a quantization parameter for adaptive quantization, the method includes: acquiring at least one pixel block corresponding to an image to be compressed and an initial adjustment value for the quantization parameter corresponding to each pixel block, the initial adjustment value for the quantization parameter being generated based on an image objective quality evaluation index; determining a just noticeable difference, JND, threshold corresponding to each pixel point in the at least one pixel block; determining a block JND threshold corresponding to each pixel block, based on the JND threshold corresponding to each pixel point in the at least one pixel block; and adjusting a corresponding initial adjustment value for the quantization parameter based on the block JND threshold, to generate an adjusted adjustment value for the quantization parameter corresponding to the at least one pixel block.

According to a second aspect, some embodiments of the present disclosure provide an apparatus for adjusting a quantization parameter for adaptive quantization, the apparatus includes: an acquisition unit, configured to acquire at least one pixel block corresponding to an image to be compressed and an initial adjustment value for the quantization parameter corresponding to each pixel block, the initial adjustment value for the quantization parameter being generated based on an image objective quality evaluation index; a first determination unit, configured to determine a just noticeable difference, JND, threshold corresponding to each pixel point in the at least one pixel block; a second determination unit, configured to determine a block JND threshold corresponding to each pixel block, based on the JND threshold corresponding to each pixel point in the at least one pixel block; and a first adjustment unit, configured to adjust a corresponding initial adjustment value for the quantization parameter based on the block JND threshold, to generate an adjusted adjustment value for the quantization parameter corresponding to the at least one pixel block.

According to a third aspect, some embodiments of the present disclosure provide an electronic device, the electronic device includes: at least one processor; and a memory, communicatively connected to the at least one processor; where the memory, storing instructions executable by the at least one processor, the instructions, when executed by the at least one processor, cause the at least one processor to perform the method according to the first aspect.

According to a fourth aspect, some embodiments of the present disclosure provide a non-transitory computer readable storage medium, storing computer instructions, the computer instructions, when executed by a processor, cause the processor to perform the method according to the first aspect.

According to a fifth aspect, some embodiments of the present disclosure provide a computer program product, comprising a computer program, the computer program, when executed by a processor, causes the processor to implement the method according to the first aspect.

It should be understood that the content described in this section is not intended to identify key or important features of embodiments of the present disclosure, nor is it intended to limit the scope of the present disclosure. Other features of the present disclosure will be easily understood by the following description.

BRIEF DESCRIPTION OF THE DRAWINGS

The accompanying drawings are used to better understand the present solution, and do not constitute a limitation to the present disclosure, in which.

DETAILED DESCRIPTION OF EMBODIMENTS

The following describes exemplary embodiments of the present disclosure in conjunction with the accompanying drawings, which includes various details of the embodiments of the present disclosure to facilitate understanding, and they should be considered as merely exemplary. Therefore, those of ordinary skill in the art should recognize that various changes and modifications may be made to the embodiments described herein without departing from the scope and spirit of the present disclosure. Also, for clarity and conciseness, descriptions of well-known functions and structures are omitted in the following description.

Figure 1:
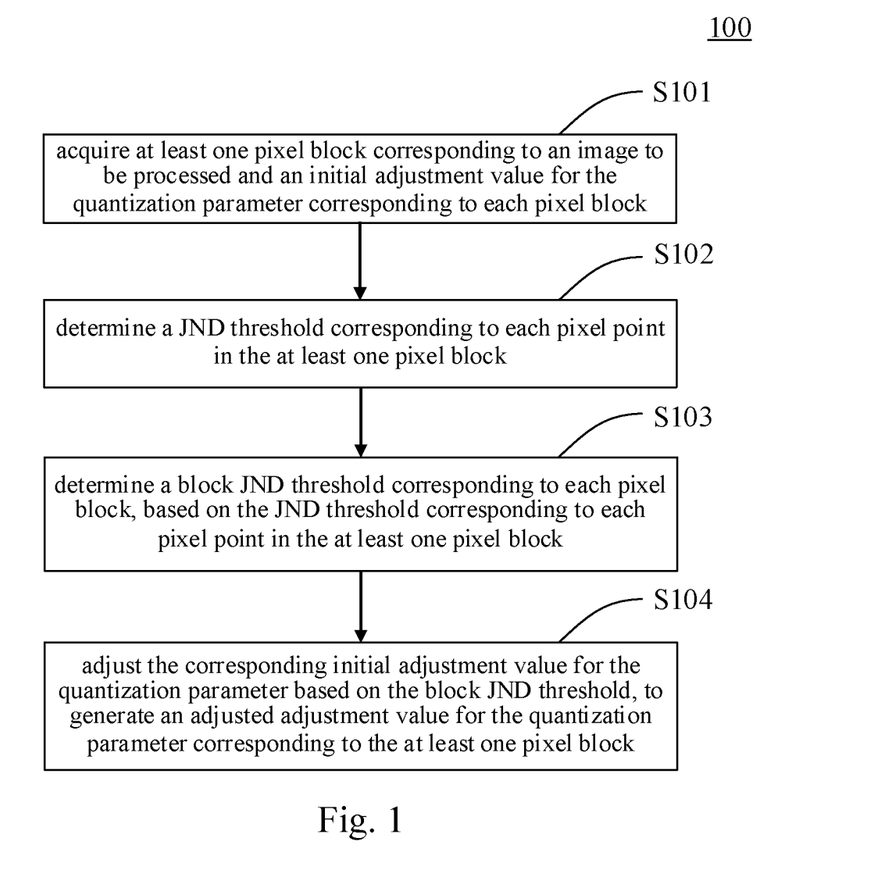
FIG. 1 is a schematic diagram of a first embodiment according to the present disclosure.

FIG. 1 is a schematic diagram 100 showing a first embodiment according to the present disclosure. The method for adjusting a quantization parameter for adaptive quantization includes the following steps:

S101, acquiring at least one pixel block corresponding to an image to be processed and an initial adjustment value for the quantization parameter corresponding to the at least one pixel block.

In the present embodiment, an executing body of the method for adjusting a quantization parameter for adaptive quantization may acquire, from a local or communication-connected electronic device, the at least one pixel block corresponding to the image to be processed and the initial adjustment value for the quantization parameter corresponding to the pixel block. The adjustment value for a quantization parameter is used to adjust the quantization parameter (QP). The above at least one pixel block may be used to represent pixel point groups in different regions on the image to be compressed. For example, the above pixel block may include a macro block obtained by partitioning the image to be compressed. As another example, the above pixel block may also include image regions obtained by partitioning a sub-image extracted from the to-be-compressed image. The initial adjustment value of the quantization parameter may be generated based on an image objective quality evaluation index. The image objective quality evaluation index may include, for example, an evaluation index obtained based on a variance, a mean squared error (MSE), a peak signal to noise rate (PSNR).

In the present embodiment, for example, the executing body may acquire the at least one pixel block corresponding to the image to be compressed, and a pre-allocated adjustment value for the quantization parameter corresponding to each pixel block as the initial adjustment value for the quantization parameter.

S102, determining a just noticeable difference (JND) threshold corresponding to each pixel point in the at least one pixel block.

In the present embodiment, the executing body may determine the JND threshold corresponding to each pixel point in the at least one pixel block acquired in step S101 in various methods. For example, the executing body may use a JND threshold determination method to determine the JND threshold corresponding to each pixel point in the at least one pixel block.

It should be noted that the JND threshold is mainly related to factors such as luminance adaptability of the visual system, a contrast mask, a module mask, and an image structure. Correspondingly, the JND threshold determination method may include a pixel-domain-based JND model and a transform-domain-based JND model, detailed description thereof will be omitted.

S103, determining a block JND threshold corresponding to each pixel block, based on the JND threshold corresponding to each pixel point in the at least one pixel block.

In the present embodiment, based on the JND threshold corresponding to each pixel point in the at least one pixel block determined in step S102, the executing body may determine the block JND threshold corresponding to each pixel block according to various methods. For example, the executing body may determine a maximum or minimum value of JND thresholds corresponding to pixel points of the same one pixel block as the block JND threshold corresponding to the pixel block. As another example, the executing body may determine a JND threshold corresponding to a pixel at a center position of a pixel block in the pixels belong to the same one pixel block as the block JND threshold corresponding to the pixel block.

S104, adjusting the corresponding initial adjustment value for the quantization parameter based on the block JND threshold, to generate an adjusted adjustment value for the quantization parameter corresponding to the at least one pixel block.

In the present embodiment, based on the block JND threshold corresponding to each pixel block determined in step S103, the executing body may adjust the corresponding initial adjustment value for the quantization parameter according to various methods, thereby generating the adjusted adjustment value for the quantization parameter corresponding to the at least one pixel block.

In the present embodiment, for example, based on a corresponding relationship between a preset block JND threshold and the adjustment value for the quantization parameter, the executing body may determine an adjustment value (for example, +0.5) for the quantization parameter that matches the determined block JND threshold. Then, the executing body may combine the matched adjustment value for the quantization parameter with the initial adjustment value (for example, +1) for the quantization parameter acquired in step S101, to generate the corresponding adjusted adjustment value (for example, +1.5) for the quantization parameter.

In the method provided by the above embodiment of the present disclosure, the initial adjustment value for the quantization parameter generated based on the image objective quality evaluation index is adjusted through the determined JND threshold, so as to generate the adjusted adjustment value for the quantization parameter. It is realized that under the premise of not reducing an image objective quality as much as possible, image subjective redundancy is further reduced by using human visual characteristics. Therefore, the compression rate may be increased without reducing an image subjective quality, or the image subjective quality may be improved without reducing the compression rate.

In some alternative implementations of the present embodiment, the executing body may acquire the at least one pixel block corresponding to the image to be compressed and the initial adjustment value for the quantization parameter corresponding to the each pixel block according to the following steps:

A first step, acquiring the image to be compressed.

In these implementations, the executing body may acquire the image to be compressed the locally or from an electronic device in communication connection.

A second step, constructing a subsampled map of the image to be compressed.

In these implementations, the executing body may construct the subsampled map of the image to be compressed acquired in the first step using various existing methods.

A third step, partitioning the subsampled map into the at least one pixel block.

A fourth step, acquiring the at least one pixel block and the initial adjustment value for the quantization parameter corresponding to the pixel block.

Based on the above alternative implementations, this solution may use the subsampled map to significantly reduce the amount of pixel need to processed, thereby improving the speed of image compression. For example, when a length and width of the subsampled map are half of a length and width of the image to be compressed, the amount of pixels may be reduced by 75%. Moreover, because a pixel in the subsampled map retain and condense information of pixels surrounding the pixel, compared with directly selecting any pixel in the image to be compressed, more original image information can be retained, and gradient abnormalities caused by improper pixel selection may also be avoid.

Alternatively, based on the above step S101 and its alternative implementations, the executing body may also determine an average value of JND thresholds corresponding to pixel points belonging to the same one pixel block as the block JND threshold corresponding to the pixel block.

Based on the above alternative implementations, this solution determines the determined average value of the JND thresholds corresponding to the pixel points belonging to the same one pixel block as the corresponding block JND threshold, compared with selecting the JND threshold corresponding to only one of the pixels, it can more accurately represent an overall sensitivity of human eyes to the pixel block. In addition, this solution may also determine the average value of the JND thresholds of the pixels calculated based on the pixels in the subsampled map as the corresponding block JND threshold, so as to compare the original image information retained by the subsampled map with the block average value, which can improve the compression speed while reducing an accuracy loss.

In some alternative implementations of the present embodiment, based on the determined block JND threshold, the executing body may adjust the corresponding initial adjustment value for the quantization parameter, to generate the adjusted adjustment value for the quantization parameter corresponding to the at least one pixel block according to the following method:

for a pixel block in the at least one pixel block, in response to determining that the block JND threshold corresponding to the pixel block is greater than a preset block JND threshold, generating, based on the block JND threshold, an adjustment value for the quantization parameter for the block JND threshold; generating the adjusted adjustment value for the quantization parameter corresponding to the pixel block based on a fusion of the adjustment value for the quantization parameter for the block JND threshold and the corresponding initial adjustment value for the quantization parameter.

In these implementations, based on the block JND threshold, the executing body may generate the adjustment value for the quantization parameter of the block JND threshold in various methods. For example, the executing body may determine the adjustment value for the quantization parameter of the block JND threshold according to the corresponding relationship (for example, linear relationship) between the preset block JND threshold and the adjustment value for the quantization parameter of the block JND threshold. The fusion of the adjustment value for the quantization parameter of the block JND threshold and the corresponding initial adjustment value for the quantization parameter may also adopt various methods, such as weighted averaging, or direct adding.

Based on the above alternative implementations, this solution may adjust the quantization parameter corresponding to a pixel block that is relatively insensitive to human eyes based on the image subjective quality, thereby avoiding the problem of a significant drop in objective indicators due to image compression based on image subjective quality indicators.

The image to be compressed may include a video frame to be compressed. The executing body may also continue to perform steps as follows:

S105, adjusting the quantization parameter corresponding to the at least one pixel block based on the generated adjusted adjustment value for the quantization parameter.

In these implementations, based on the generated adjusted adjustment value for the quantization parameter, the executing body may adjust the quantization parameter corresponding to the at least one pixel block in various methods. For example, in response to determining that the generated adjusted adjustment value for the quantization parameter is used to indicate an increase in the quantization parameter (for example, $\Delta QP$ is positive), the executing body may increase the quantization parameter corresponding to the pixel block indicated by the adjusted quantization parameter. As another example, in response to determining that the generated adjusted adjustment value for the quantization parameter is used to indicate a reduction of the quantization parameter (for example, $\Delta QP$ is negative), the executing body may decrease the quantization parameter corresponding to the pixel block indicated by the adjusted quantization parameter. Therefore, the executing body may adjust the quantization parameter corresponding to the at least one pixel block.

Step 106, adjusting a bit rate of a video corresponding to the video frame to be compressed, based on the adjusted quantization parameter corresponding to the at least one pixel block.

In these implementations, the executing body may compress the video frame to be compressed based on the quantization parameter corresponding to the at least one pixel block adjusted in step S105, so as to adjust the bit rate of the video corresponding to the video frame to be compressed. Alternatively, the executing body may also use multi-threading technology to process related video frames to be compressed in parallel, so as to further improve the video compression efficiency.

Based on the above alternative implementations, this solution may reduce the image subjective redundancy without significantly reducing the image objective quality, thereby improving the video compression efficiency.

Figure 2:
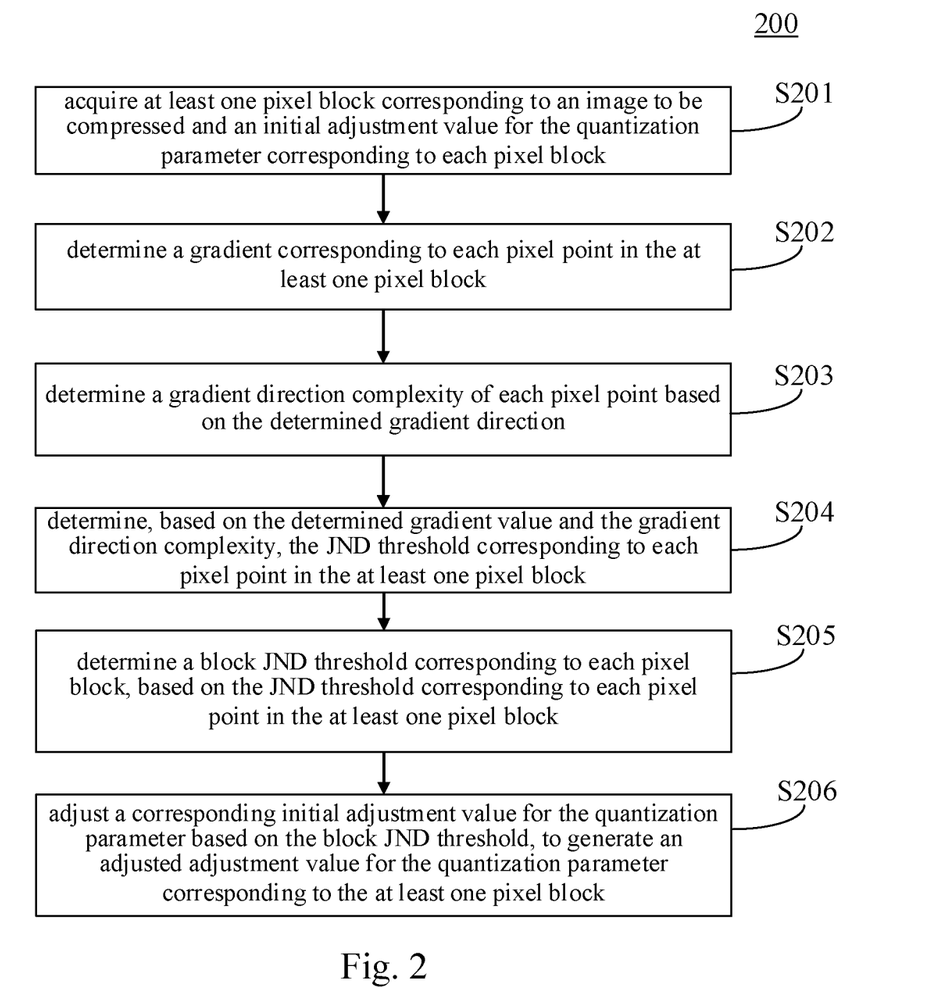
FIG. 2 is a schematic diagram of a second embodiment according to the present disclosure.

With further reference to FIG. 2, FIG. 2 is a schematic diagram 200 showing a second embodiment according to the present disclosure. The method for adjusting a quantization parameter for adaptive quantization includes the following steps:

S201, acquiring at least one pixel block corresponding to an image to be compressed and an initial adjustment value for the quantization parameter corresponding to each pixel block.

S202, determining a gradient corresponding to each pixel point in the at least one pixel block.

In the present embodiment, the executing body of the method for adjusting a quantization parameter for adaptive quantization may determine the gradient corresponding to each pixel point in the at least one pixel block acquired in step S201 in various methods. The gradient may include a gradient value and a gradient direction. The gradient may be obtained, for example, by calculating a horizontal direction gradient and a vertical direction gradient respectively by using two filters.

Step 203, determining a gradient direction complexity of each pixel point based on the determined gradient direction.

In the present embodiment, based on the gradient direction determined in step S202, the executing body may determine the gradient direction complexity of each pixel point in various methods. The gradient direction complexity may be used to represent gradient directions of pixel points within a preset range from the pixel point. For example, the gradient direction complexity may be the number of different directions included. As another example, the gradient direction complexity may be a standard deviation of the gradient directions (angles). The preset range may be, for example, a 3×3 matrix.

In some alternative implementations of the present embodiment, based on the determined gradient direction, the executing body may determine the gradient direction complexity of each pixel point according to the following steps:

A first step, generating a preset direction set based on the number of the pixel points in the preset range.

In these implementations, the preset direction set may include different preset directions. For example, the preset range may be a 3×3 matrix, and the number of pixel points is 9, and the executing body may generate a preset direction set containing 9 preset directions, that is, 180° is divided into 9 measures, a preset direction is obtained every other 20°.

Alternatively, the preset direction set may include an empty direction used to indicate that the gradient value is less than a preset gradient threshold. Following the above example, the preset direction set may include 8 directions obtained by dividing 180° by 22.5° and one empty direction. Since pixels with too low gradient are likely to be noise, this solution may avoid the situation that noise in the plane causes excessive gradient direction complexity, which in turn affects a result accuracy.

A second step, determining, based on matching between the determined gradient direction and the preset directions in the preset direction set, a preset direction to which the gradient direction of each pixel point belongs thereto.

A third step, determining information entropy of the distributions of the preset directions corresponding to the pixel points within the preset range of each pixel point as the gradient direction complexity of each pixel point.

Based on the alternative implementations, this solution may use the information entropy of the distributions of the gradient directions to more accurately represent the gradient direction complexity, and effectively improve recognition of texture. For example, for a 3×3 pixel block, the first situation includes that the directions of 8 pixels in the pixel block belong to the direction A and the direction of 1 pixel in the pixel block belongs to the direction B, and the second situation includes that the directions of 4 pixels in the pixel block belong to the direction A and directions of 5 pixels in the pixel block belong to the direction B. In these two situations, the number of different directions included in the pixel block is same, but the information entropies thereof are different. Therefore, this solution may effectively distinguish a texture-insensitive pixel block and an over-bright/over-dark pixel block, and provide a more accurate data reference for improving the compression rate of the pixel block.

S204, determining, based on the determined gradient value and the gradient direction complexity, the JND threshold corresponding to each pixel point in the at least one pixel block.

In the present embodiment, based on the gradient value determined in step S202 and the gradient direction complexity determined in step 203, the executing body may determine the JND threshold corresponding to each pixel point in the at least one pixel block in various methods. For example, the executing body may determine a luminance contrast based on the gradient value. The executing body may also determine gradient direction masking effects based on the determined luminance contrast and the gradient direction complexity. The executing body may also determine contrast masking effects based on the determined luminance contrast. The execution subject may also determine the maximum value of the contrast masking effects and the gradient direction masking effects as spatial masking effects. The executing body may determine a background luminance based on a luminance of a region around the pixel and calculate a luminance adaptive value. Finally, the executing body may determine the JND threshold corresponding to the pixel point based on the spatial masking effects and the luminance adaptive value.

In some alternative implementations of the present embodiment, based on the determined gradient value and the gradient direction complexity, the executing body may determine the JND threshold corresponding to each pixel point in the at least one pixel block according to a preset formula. The preset formula may include a nonlinear function. A function value of the nonlinear function may be obtained by querying a pre-calculated function value table. The function value table may include at least one of: an arctangent function, an exponential function, a logarithmic function, a radical function, or a power function.

For example, the executing body may determine the gradient direction masking effects by the following formula:

$$M_p = \log_2(1 + C_l) \cdot a_1 \cdot \frac{C_p^{a_2}}{C_p^2 + a_3^2}$$

The above $C_l$ may be used to represent the luminance contrast. A value of the luminance contrast may be consistent with the gradient value. The above $C_p$ may be used to represent the gradient direction complexity. The above $a_1$, $a_2$, and $a_3$ may be used as preset coefficients, and their values may be, for example, 0.8, 2.7, and 0.1 respectively.

In the present embodiment, for the values of the above logarithmic function and the power function, the executing body may obtain them by querying the pre-calculated function value table. For example, for a 3×3 pixel block, the value of $C_p$ may be a natural number from 1 to 9. A function value table of the power function, for example, may include values of $1^{2.7}, 2^{2.7}, 3^{2.7}, \ldots 8^{2.7}, 9^{2.7}$.

Based on the alternative implementations, this solution may replace the calculation of the nonlinear function with a query operation on the pre-calculated function value table, thereby significantly improving the speed of calculation. Since the pixel values (0~255) and a quantized angle value of the direction (for example, a 3×3 region corresponds to up to 9 directions) are discrete and limited, it provides a feasibility guarantee for pre-calculation with different precisions (for example, the arctangent function with 0.01 precision). Moreover, when representing the JND threshold with a pixel block as a unit to, errors caused by the pre-calculation may be further reduced.

S205, determining a block JND threshold corresponding to each pixel block, based on the JND threshold corresponding to each pixel point in the at least one pixel block.

S206, adjusting the corresponding initial adjustment value for the quantization parameter based on the block JND threshold, to generate an adjusted adjustment value for the quantization parameter corresponding to the at least one pixel block.

The above steps S201, S205, and S206 may be respectively consistent with steps S101, S103, and S104 and their alternative implementations in the foregoing embodiment. The above description of S101, S103, and S104 and their alternative implementations is also applicable to S201, S205 and S206, and detailed description thereof will be omitted.

It can be seen from FIG. 2 that the flow 200 of the method for adjusting a quantization parameter for adaptive quantization in the present embodiment reflects the step of determining the gradient direction complexity based on the gradient direction of each pixel point, and the step of determining the JND threshold corresponding to the pixel point based on the determined gradient direction complexity and the gradient value. Therefore, the solution described in the present embodiment provides a method for determining the JND threshold corresponding to the pixel point based on the gradient direction and the gradient value, thereby enriching the method for determining the JND threshold of the pixel point, and may provide a basis for subsequent improvements in execution speed of the method for determining the JND threshold, so as to adapt to real-time application scenarios such as streaming media.

In some alternative implementations of the present embodiment, based on the determined block JND threshold, the executing body may adjust the corresponding initial adjustment value for the quantization parameter, to generate the adjusted adjustment value for quantization parameter corresponding to the at least one pixel block according to the following method:

for a pixel block in the at least one pixel block, in response to determining that the block JND threshold corresponding to the pixel block is greater than a preset block JND threshold, generating, based on the block JND threshold, an adjustment value for the quantization parameter of the JND threshold; generating the adjusted adjustment value for quantization parameter corresponding to the pixel block, based on a fusion of the adjustment value for the quantization parameter of the block JND threshold and the corresponding initial adjustment value for the quantization parameter.

The image to be compressed may include a video frame to be compressed. The executing body may also continue to perform steps as follows:

S207, adjusting a quantization parameter corresponding to the at least one pixel block based on the generated adjusted adjustment value for the quantization parameter.

Step 208, adjusting the bit rate of the video corresponding to the video frame to be compressed, based on the adjusted quantization parameter corresponding to the at least one pixel block.

The above steps and corresponding technical effects may be consistent with the corresponding description in the alternative implementations in the foregoing embodiment, and detailed description thereof will be omitted.

Figure 3:
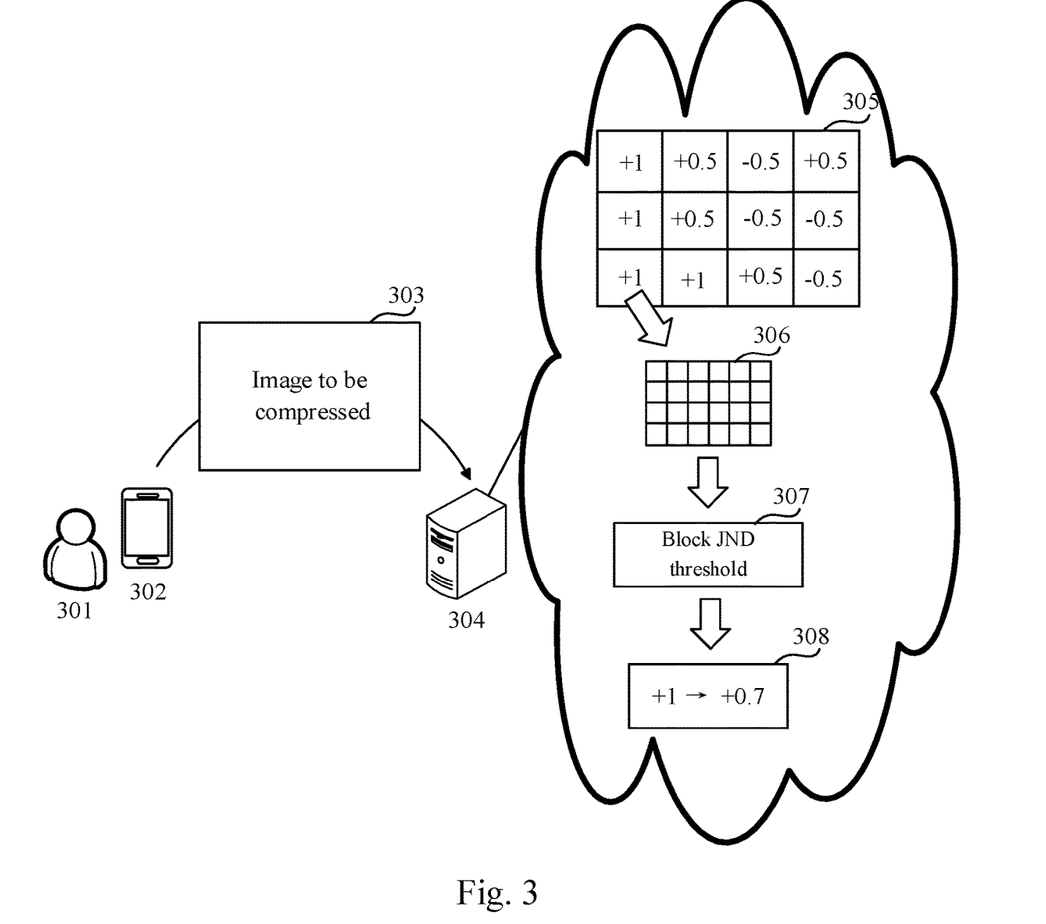
FIG. 3 is a schematic diagram of an application scenario that may implement a method for adjusting a quantization parameter for adaptive quantization according to an embodiment of the present disclosure.

With further reference to FIG. 3, FIG. 3 is a schematic diagram of an application scenario that may implement a method for adjusting a quantization parameter for adaptive quantization according to an embodiment of the present disclosure. In the application scenario of FIG. 3, a user 301 uses a terminal device 302 to send a image 303 to be compressed to a server 304. The server 304 may partition the image 303 into 4×3 pixel blocks as shown in 305, and may acquire initial adjustment values for the quantization parameter corresponding to the 12 pixel blocks respectively. Using a pixel block in the lower left corner shown in 305 as an example, the server 304 may determine JND thresholds corresponding to 6×4 pixels (as shown in 306) included in the above pixel block. Then, based on the determined JND thresholds corresponding to the 24 pixels, the server 304 may determine a block JND threshold 307 corresponding to the pixel block located in the lower left corner in 305. Then, based on the determined block JND threshold 307, the server may adjust the initial adjustment value for the quantization parameter corresponding to the above pixel block, for example, adjust the adjustment value from +1 to +0.7 (as shown in 308).

Currently, one of the existing technologies such as HEVC encoding mainly adopts rate-distortion optimized quantization (RDOQ) and adaptive quantization to further reduce subjective redundancy in video data. However, an adjustment range in the above RDOQ is very small, and its effects on low bit rate is not obvious. While the adaptive quantization method usually directly adjusts a quantization parameter based on a JND model, it has a great impact on the image objective quality. However, the method provided by embodiments of the present disclosure, the initial adjustment value for the quantization parameter generated based on the image objective quality evaluation index is adjusted through the determined JND threshold, so as to generate the adjusted adjustment value for the quantization parameter. It is realized that under the premise of not reducing the image objective quality as much as possible, image subjective redundancy is further reduced based on human visual characteristics. Therefore, a compression rate may be increased without reducing an image subjective quality, or the image subjective quality may be improved without reducing the compression rate.

Figure 4:
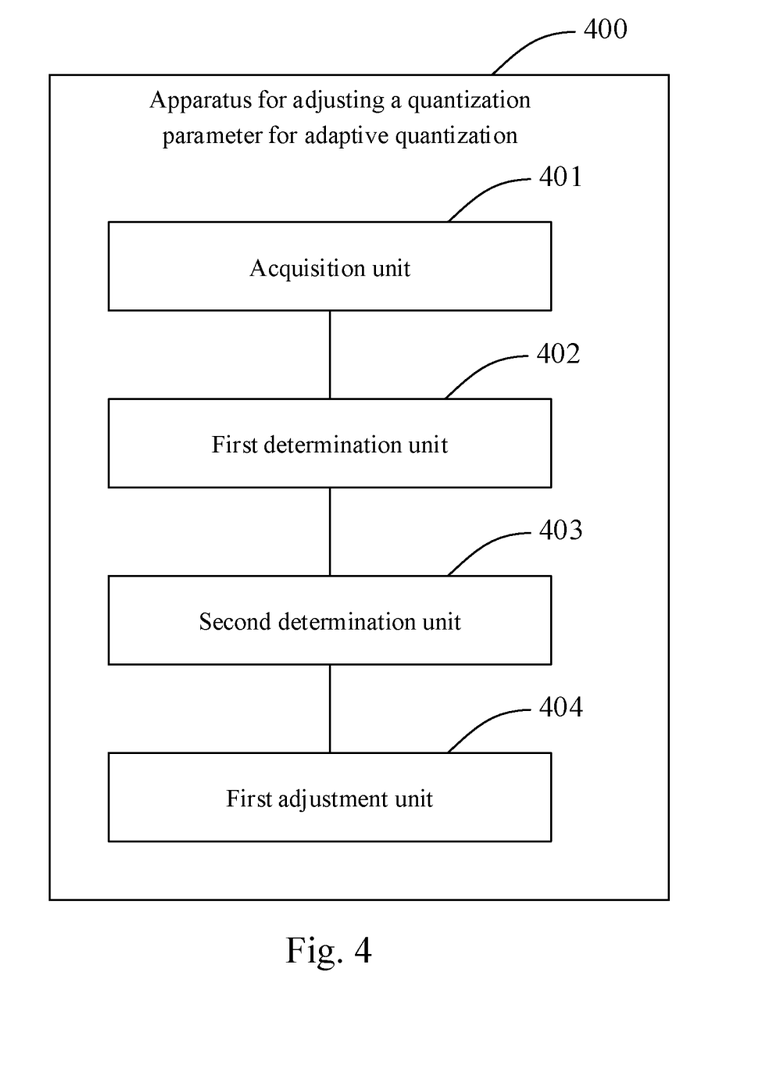
FIG. 4 is a schematic diagram of an application scenario that may implement an apparatus for adjusting a quantization parameter for adaptive quantization according to an embodiment of the present disclosure.

With further reference to FIG. 4, as an implementation of the method shown in the above figures, an embodiment of the present disclosure provides an apparatus for adjusting a quantization parameter for adaptive quantization, and the embodiment of the apparatus corresponds to the embodiment of the method as shown in FIG. 1 or FIG. 2, and the apparatus may be applied to various electronic devices.

As shown in FIG. 4, the apparatus 400 for adjusting a quantization parameter for adaptive quantization of the present embodiment includes: an acquisition unit 401, a first determination unit 402, a second determination unit 403 and a first adjustment unit 404. The acquisition unit 401 is configured to acquire at least one pixel block corresponding to an image to be compressed and an initial adjustment value for the quantization parameter corresponding to each pixel block, the initial adjustment value for the quantization parameter being generated based on an image objective quality evaluation index. The first determination unit 402 is configured to determine a just noticeable difference, JND, threshold corresponding to each pixel point in the at least one pixel block. The second determination unit 403 is configured to determine a block JND threshold corresponding to each pixel block, based on the JND threshold corresponding to each pixel point in the at least one pixel block. The first adjustment unit 404 is configured to adjust a corresponding initial adjustment value for the quantization parameter based on the block JND threshold, to generate an adjusted adjustment value for the quantization parameter corresponding to the at least one pixel block.

In the present embodiment, in the apparatus 400 for adjusting a quantization parameter for adaptive quantization: for the specific processing and the technical effects of the acquisition unit 401, the first determination unit 402, the second determination unit 403, and the first adjustment unit 404, reference may be made to the relevant description of steps S101, S102, S103, and S104 in the embodiment corresponding to FIG. 1 respectively, and detailed description thereof will be omitted.

In some alternative implementations of the present embodiment, the acquisition unit 401 may include: an acquisition module (not shown in the figure), configured to acquire the image to be processed; a construction module (not shown in the figure), configured to construct a subsampled map of the image to be processed; a partitioning module (not shown in the figure), configured to partition the subsampled map into the at least one pixel block; and an acquisition module (not shown in the figure), configured to acquire the at least one pixel block and the initial adjustment value for the quantization parameter corresponding to the at least one pixel block.

In some alternative implementations of the present embodiment, the second determination unit 403 may be further configured to: determine an average value of JND thresholds corresponding to pixel points belonging to a same pixel block in pixel points comprised in the at least one pixel block as the block JND threshold corresponding to the pixel block.

In some alternative implementations of the present embodiment, the first determination unit 402 may include: a first determination module (not shown in the figure), configured to determine a gradient corresponding to each pixel point in the at least one pixel block, wherein the gradient comprises a gradient value and a gradient direction; a second determination module (not shown in the figure), configured to determine a gradient direction complexity of a pixel point based on the determined gradient direction, wherein the gradient direction complexity is used to represent situations of gradient directions of pixel points within a preset range from the pixel point; and a third determination module (not shown in the figure), configured to determine the JND threshold corresponding to each pixel point in the at least one pixel block, based on the determined gradient value and the gradient direction complexity.

In some alternative implementations of the present embodiment, the second determination unit may be further configured to: a preset direction set based on a number of the pixel points within the preset range, wherein the preset direction set comprises different preset directions; determine, based on matching between the determined gradient direction and the preset directions in the preset direction set, a preset direction matching with the gradient direction of each pixel point; and determine information entropy of distributions of preset directions corresponding to the pixel points within the preset range of each pixel point as the gradient direction complexity of the each pixel point.

In some alternative implementations of the present embodiment, the preset direction set may include an empty direction used to indicate that the gradient value is less than a preset gradient threshold.

In some alternative implementations of the present embodiment, the third determination module may be further configured to: determine, according to a preset formula, the JND threshold corresponding to each pixel point in the at least one pixel block based on the determined gradient value and the gradient direction complexity, wherein the preset formula comprises a nonlinear function, and a function value of the nonlinear function is obtained by querying a pre-calculated function value table.

In some alternative implementations of the present embodiment, the first adjustment unit 404 may be further configured to: for a pixel block in the at least one pixel block, in response to determining that the block JND threshold corresponding to the pixel block is greater than a preset block JND threshold, generate, based on the block JND threshold, an adjustment value for the quantization parameter for the block JND threshold; generate the adjusted adjustment value for the quantization parameter corresponding to the pixel block based on a fusion of the adjustment value for the quantization parameter for the block JND threshold and the corresponding initial adjustment value for the quantization parameter. The image to be compressed may include a video frame to be compressed. The apparatus for adjusting a quantization parameter for adaptive quantization may further include: a second adjustment unit (not shown in the figure), configured to adjust the quantization parameter corresponding to the at least one pixel block based on the generated adjusted adjustment value for quantization parameter; and a third adjustment unit (not shown in the figure), configured to adjust a bit rate of a video corresponding to the video frame to be processed, based on the adjusted quantization parameter corresponding to the at least one pixel block.

In the apparatus provided by the above embodiment of the present disclosure, the second determination unit 403 determines the JND threshold of the pixel block based on the JND thresholds of the pixels determined by the first determination unit 402, the first adjustment unit 404 adjusts the initial adjustment value for the quantization parameter acquired by the acquisition unit 401 based on the JND threshold of the pixel block, so as to generate the adjusted adjustment value for the quantization parameter. It is realized that under the premise of not reducing an image objective quality as much as possible, image subjective redundancy is further reduced based on human visual characteristics. Therefore, a compression rate may be increase without reducing an image subjective quality, or the image subjective quality may be improved without reducing the compression rate.

According to an embodiment of the present disclosure, an electronic device, a readable storage medium and a computer program product are also provided.

Figure 5:
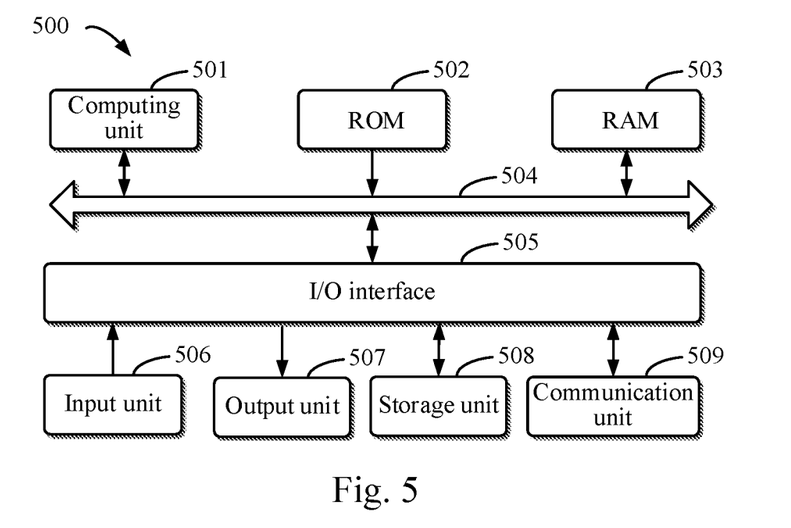
FIG. 5 is a block diagram of an electronic device used to implement the method for adjusting a quantization parameter for adaptive quantization according to an embodiment of the present disclosure.

FIG. 5 shows a schematic block diagram of an example electronic device 500 used to implement embodiments of the present disclosure. The electronic device is intended to represent various forms of digital computers, such as laptop computers, desktop computers, workbenches, personal digital assistants, servers, blade servers, mainframe computers, and other suitable computers. The electronic device may also represent various forms of mobile apparatuses, such as personal digital processors, cellular phones, smart phones, wearable devices, and other similar computing apparatuses. The components shown herein, their connections and relationships, and their functions are merely examples, and are not intended to limit the implementation of the present disclosure described and/or claimed herein.

As shown in FIG. 5, the device 500 includes a computing unit 501, which may perform various appropriate actions and processing, based on a computer program stored in a read-only memory (ROM) 502 or a computer program loaded from a storage unit 508 into a random access memory (RAM) 503. In the RAM 503, various programs and data required for the operation of the device 500 may also be stored. The computing unit 501, the ROM 502, and the RAM 503 are connected to each other through a bus 504. An input/output (I/O) interface 505 is also connected to the bus 504.

A plurality of components in the device 500 are connected to the I/O interface 505, including: an input unit 506, for example, a keyboard and a mouse; an output unit 507, for example, various types of displays and speakers; the storage unit 508, for example, a disk and an optical disk; and a communication unit 509, for example, a network card, a modem, or a wireless communication transceiver. The communication unit 509 allows the device 500 to exchange information/data with other devices over a computer network such as the Internet and/or various telecommunication networks.

The computing unit 501 may be various general-purpose and/or dedicated processing components having processing and computing capabilities. Some examples of the computing unit 501 include, but are not limited to, central processing unit (CPU), graphics processing unit (GPU), various dedicated artificial intelligence (AI) computing chips, various computing units running machine learning model algorithms, digital signal processor (DSP), and any appropriate processors, controllers, microcontrollers, etc. The computing unit 501 performs the various methods and processes described above, such as the method for adjusting a quantization parameter for adaptive quantization. For example, in some embodiments, the method for adjusting a quantization parameter for adaptive quantization may be implemented as a computer software program, which is tangibly included in a machine readable medium, such as the storage unit 508. In some embodiments, part or all of the computer program may be loaded and/or installed on the device 500 via the ROM 502 and/or the communication unit 509. When the computer program is loaded into the RAM 503 and executed by the computing unit 501, one or more steps of the method for adjusting a quantization parameter for adaptive quantization described above may be performed. Alternatively, in other embodiments, the computing unit 501 may be configured to perform the method for adjusting a quantization parameter for adaptive quantization by any other appropriate means (for example, by means of firmware).

Various embodiments of the systems and technologies described herein may be implemented in digital electronic circuit systems, integrated circuit systems, dedicated ASICs (application specific integrated circuits), ASSP (application specific standard product), SOC (System of systems on a chip), CPLD (Load programmable logic devices), computer hardware, firmware, software, and/or combinations thereof. These various embodiments may include: being implemented in one or more computer programs that can be executed and/or interpreted on a programmable system that includes at least one programmable processor. The programmable processor may be a dedicated or general-purpose programmable processor, and may receive data and instructions from a storage system, at least one input apparatus, and at least one output apparatus, and transmit the data and instructions to the storage system, the at least one input apparatus, and the at least one output apparatus.

The program code used to implement the method for processing an image according to embodiments of the present disclosure may be written in one programming language or in any combination of more programming languages. The above program code may be packaged into a computer program product. These program code or computer program product may be supplied to the processor or controller of a general-purpose computer, a dedicated computer, or other programmable data processing device, so that the program code, when executed by computation unit 601, enables the function/operation specified in the flow charts and/or block diagrams to be performed. The program code may be completely executed on a user's computer, partially executed on a user's computer, executed as a separate software package, partially executed on a user's computer and partially executed on a remote computer, or completely executed on a remote computer or server.

In the context of the present disclosure, the machine-readable medium may be a tangible medium that may contain or store a program intended for use with or in combination with an instruction execution system, device, or equipment. The machine-readable medium can be a machine-readable signal medium or a machine-readable storage medium. Machine readable media may include, but are not limited to, electronic, magnetic, optical, electromagnetic, infrared, or semiconductor systems, devices or equipment, or any appropriate combination of the foregoing. More concrete examples of the machine-readable storage medium may include the electrical connection based on one or more wires, portable computer disk, hard disk, random access memory (RAM), read-only memory (ROM), erasable and programmable read-only memory (EPROM or flash memory), optical fiber, convenient type compact disk read only memory (CD-ROM), optical storage devices, magnetic storage device, or any appropriate combination of the foregoing.

In order to provide interaction with a user, the systems and technologies described herein may be implemented on a computer, the computer has: a display apparatus for displaying information to the user (for example, CRT (cathode ray tube) or LCD (liquid crystal display) monitor); and a keyboard and a pointing apparatus (for example, mouse or trackball), and the user may use the keyboard and the pointing apparatus to provide input to the computer. Other types of apparatuses may also be used to provide interaction with the user; for example, feedback provided to the user may be any form of sensory feedback (for example, visual feedback, auditory feedback, or tactile feedback); and any form (including acoustic input, voice input, or tactile input) may be used to receive input from the user.

The systems and technologies described herein may be implemented in a computing system that includes backend components (e.g., as a data server), or a computing system that includes middleware components (e.g., application server), or a computing system that includes frontend components (for example, a user computer having a graphical user interface or a web browser, through which the user may interact with the implementations of the systems and the technologies described herein), or a computing system that includes any combination of such backend components, middleware components, or frontend components. The components of the system may be interconnected by any form or medium of digital data communication (e.g., communication network). Examples of the communication network include: local area networks (LAN), wide area networks (WAN), the Internet, and blockchain networks.

The computer system may include a client and a server. The client and the server are generally far from each other and usually interact through the communication network. The relationship between the client and the server is generated by computer programs that run on the corresponding computer and have a client-server relationship with each other.

It should be understood that the various forms of processes shown above may be used to reorder, add, or delete steps. For example, the steps described in embodiments of the present disclosure may be performed in parallel, sequentially, or in different orders. As long as the desired results of the technical solution disclosed in embodiments of the present disclosure can be achieved, no limitation is made herein.

The above specific embodiments do not constitute limitation on the protection scope of the present disclosure. Those skilled in the art should understand that various modifications, combinations, sub-combinations and substitutions may be made according to design requirements and other factors. Any modification, equivalent replacement and improvement made within the spirit and principle of the present disclosure shall be included in the protection scope of the present disclosure.

What is claimed is:

1. A method for adjusting a quantization parameter for adaptive quantization, the method comprising:
   acquiring at least one pixel block corresponding to an image to be compressed and an initial adjustment value for the quantization parameter corresponding to each pixel block, the initial adjustment value for the quantization parameter being generated based on an image objective quality evaluation index, wherein the image to be processed comprises a video frame to be processed;
   determining a just noticeable difference (JND) threshold corresponding to each pixel point in the at least one pixel block;
   determining a block JND threshold corresponding to each pixel block, based on the JND threshold corresponding to each pixel point in the at least one pixel block;
   for a pixel block in the at least one pixel block, in response to determining that the block JND threshold corresponding to the pixel block is greater than a preset block JND threshold, generating, based on the block JND threshold, an adjustment value for the quantization parameter for the block JND threshold; generating the adjusted adjustment value for the quantization parameter corresponding to the pixel block based on a fusion of the adjustment value for the quantization parameter for the block JND threshold and the corresponding initial adjustment value for the quantization parameter;
   adjusting the quantization parameter corresponding to the at least one pixel block based on the generated adjusted adjustment value for quantization parameter; and
   adjusting a bit rate of a video corresponding to the video frame to be processed, based on the adjusted quantization parameter corresponding to the at least one pixel block.

2. The method according to claim 1, wherein the acquiring the at least one pixel block corresponding to the image to be processed and the initial adjustment value for the quantization parameter corresponding to each pixel block, comprises:
   acquiring the image to be processed;
   constructing a subsampled map of the image to be processed;
   partitioning the subsampled map into the at least one pixel block; and
   acquiring the at least one pixel block and the initial adjustment value for the quantization parameter corresponding to the at least one pixel block.

3. The method according to claim 1, wherein the determining the block JND threshold corresponding to each pixel block based on the JND threshold corresponding to each pixel point in the at least one pixel block, comprises:
   determining an average value of JND thresholds corresponding to pixel points belonging to a same pixel block in pixel points comprised in the at least one pixel block as the block JND threshold corresponding to the pixel block.

4. The method according to claim 1, wherein the determining the JND threshold corresponding to each pixel point in the at least one pixel block, comprises:
   determining a gradient corresponding to each pixel point in the at least one pixel block, wherein the gradient comprises a gradient value and a gradient direction;
   determining a gradient direction complexity of each pixel point based on the gradient direction, wherein the gradient direction complexity is used to represent situations of gradient directions of pixel points within a preset range from the pixel point; and
   determining the JND threshold corresponding to each pixel point in the at least one pixel block, based on the gradient value and the gradient direction complexity.

5. The method according to claim 4, wherein the determining the gradient direction complexity of each pixel point based on the gradient direction, comprises:
   generating a preset direction set based on a number of pixel points within the preset range, wherein the preset direction set comprises different preset directions;
   determining, based on matching between the gradient direction and the preset directions in the preset direction set, a preset direction matching with the gradient direction of each pixel point; and
   determining information entropy of distributions of preset directions corresponding to the pixel points within the preset range of each pixel point as the gradient direction complexity of the each pixel point.

6. The method according to claim 5, wherein the preset direction set comprises an empty direction used to indicate that the gradient value is less than a preset gradient threshold.

7. The method according to claim 4, wherein the determining the JND threshold corresponding to each pixel point in the at least one pixel block, based on the gradient value and the gradient direction complexity, comprises:
   determining, according to a preset formula, the JND threshold corresponding to each pixel point in the at least one pixel block based on the gradient value and the gradient direction complexity, wherein the preset formula comprises a nonlinear function, and a function value of the nonlinear function is obtained by querying a pre-calculated function value table.

8. An electronic device, comprising:
   at least one processor; and
   a memory, communicatively connected to the at least one processor; wherein,
   the memory, storing instructions executable by the at least one processor, the instructions, when executed by the at least one processor, cause the at least one processor to perform operations, the operations comprising:
   acquiring at least one pixel block corresponding to an image to be compressed and an initial adjustment value for a quantization parameter corresponding to each pixel block, the initial adjustment value for the quantization parameter being generated based on an image objective quality evaluation index, wherein the image to be processed comprises a video frame to be processed;
   determining a just noticeable difference (JND) threshold corresponding to each pixel point in the at least one pixel block;
   determining a block JND threshold corresponding to each pixel block, based on the JND threshold corresponding to each pixel point in the at least one pixel block; and
   for a pixel block in the at least one pixel block, in response to determining that the block JND threshold corresponding to the pixel block is greater than a preset block JND threshold, generating, based on the block JND threshold, an adjustment value for the quantization parameter for the block JND threshold; generating the adjusted adjustment value for the quantization parameter corresponding to the pixel block based on a fusion of the adjustment value for the quantization parameter for the block JND threshold and the corresponding initial adjustment value for the quantization parameter;

adjusting the quantization parameter corresponding to the at least one pixel block based on the generated adjusted adjustment value for quantization parameter; and adjusting a bit rate of a video corresponding to the video frame to be processed, based on the adjusted quantization parameter corresponding to the at least one pixel block.

9. The electronic device according to claim 8, wherein the acquiring the at least one pixel block corresponding to the image to be processed and the initial adjustment value for the quantization parameter corresponding to each pixel block, comprises:

acquiring the image to be processed;

constructing a subsampled map of the image to be processed;

partitioning the subsampled map into the at least one pixel block; and acquiring the at least one pixel block and the initial adjustment value for the quantization parameter corresponding to the at least one pixel block.

10. The electronic device according to claim 8, wherein the determining the block JND threshold corresponding to each pixel block based on the JND threshold corresponding to each pixel point in the at least one pixel block, comprises:

determining an average value of JND thresholds corresponding to pixel points belonging to a same pixel block in pixel points comprised in the at least one pixel block as the block JND threshold corresponding to the pixel block.

11. The electronic device according to claim 8, wherein the determining the JND threshold corresponding to each pixel point in the at least one pixel block, comprises:

determining a gradient corresponding to each pixel point in the at least one pixel block, wherein the gradient comprises a gradient value and a gradient direction;

determining a gradient direction complexity of a pixel point based on the gradient direction, wherein the gradient direction complexity is used to represent situations of gradient directions of pixel points within a preset range from the pixel point; and determining the JND threshold corresponding to each pixel point in the at least one pixel block, based on the gradient value and the gradient direction complexity.

12. The electronic device according to claim 11, wherein the determining the gradient direction complexity of each pixel point based on the gradient direction, comprises:

generating a preset direction set based on a number of pixel points within the preset range, wherein the preset direction set comprises different preset directions;

determining, based on matching between the gradient direction and the preset directions in the preset direction set, a preset direction matching with the gradient direction of each pixel point; and determining information entropy of distributions of preset directions corresponding to the pixel points within the preset range of each pixel point as the gradient direction complexity of the each pixel point.

13. The electronic device according to claim 12, wherein the preset direction set comprises an empty direction used to indicate that the gradient value is less than a preset gradient threshold.

14. The electronic device according to claim 11, wherein the determining the JND threshold corresponding to each pixel point in the at least one pixel block, based on the gradient value and the gradient direction complexity, comprises:

determining, according to a preset formula, the JND threshold corresponding to each pixel point in the at least one pixel block based on the gradient value and the gradient direction complexity, wherein the preset formula comprises a nonlinear function, and a function value of the nonlinear function is obtained by querying a pre-calculated function value table.

15. A non-transitory computer readable storage medium, storing computer instructions, the computer instructions, when executed by a processor, cause the processor to perform operations, the operations comprising:

acquiring at least one pixel block corresponding to an image to be compressed and an initial adjustment value for a quantization parameter corresponding to each pixel block, the initial adjustment value for the quantization parameter being generated based on an image objective quality evaluation index, wherein the image to be processed comprises a video frame to be processed;

determining a just noticeable difference (JND) threshold corresponding to each pixel point in the at least one pixel block;

determining a block JND threshold corresponding to each pixel block, based on the JND threshold corresponding to each pixel point in the at least one pixel block; and for a pixel block in the at least one pixel block, in response to determining that the block JND threshold corresponding to the pixel block is greater than a preset block JND threshold, generating, based on the block JND threshold, an adjustment value for the quantization parameter for the block JND threshold; generating the adjusted adjustment value for the quantization parameter corresponding to the pixel block based on a fusion of the adjustment value for the quantization parameter for the block JND threshold and the corresponding initial adjustment value for the quantization parameter;

adjusting the quantization parameter corresponding to the at least one pixel block based on the generated adjusted adjustment value for quantization parameter; and adjusting a bit rate of a video corresponding to the video frame to be processed, based on the adjusted quantization parameter corresponding to the at least one pixel block.

16. The non-transitory computer readable storage medium according to claim 15, wherein the acquiring the at least one pixel block corresponding to the image to be processed and the initial adjustment value for the quantization parameter corresponding to each pixel block, comprises:

acquiring the image to be processed;

constructing a subsampled map of the image to be processed;

partitioning the subsampled map into the at least one pixel block; and acquiring the at least one pixel block and the initial adjustment value for the quantization parameter corresponding to the at least one pixel block.

17. The non-transitory computer readable storage medium according to claim 15, wherein the determining the block JND threshold corresponding to each pixel block based on the JND threshold corresponding to each pixel point in the at least one pixel block, comprises:

determining an average value of JND thresholds corresponding to pixel points belonging to a same pixel block in pixel points comprised in the at least one pixel block as the block JND threshold corresponding to the pixel block.

18. The non-transitory computer readable storage medium according to claim 15, wherein the determining the JND threshold corresponding to each pixel point in the at least one pixel block, comprises:

determining a gradient corresponding to each pixel point in the at least one pixel block, wherein the gradient comprises a gradient value and a gradient direction;

determining a gradient direction complexity of a pixel point based on the gradient direction, wherein the gradient direction complexity is used to represent situations of gradient directions of pixel points within a preset range from the pixel point; and determining the JND threshold corresponding to each pixel point in the at least one pixel block, based on the gradient value and the gradient direction complexity.

\* \* \* \* \*